(No Model.)
J. G. BAKER.
PROCESS OF CUTTING UP PLASTIC OR YIELDING SUBSTANCES.
No. 271,399. Patented Jan. 30, 1883.
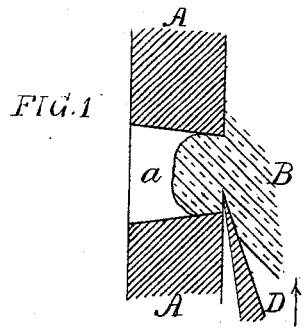
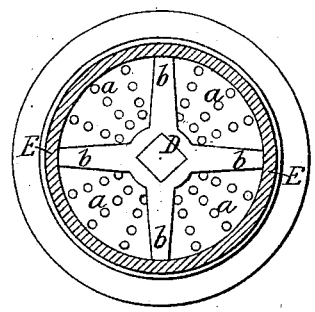
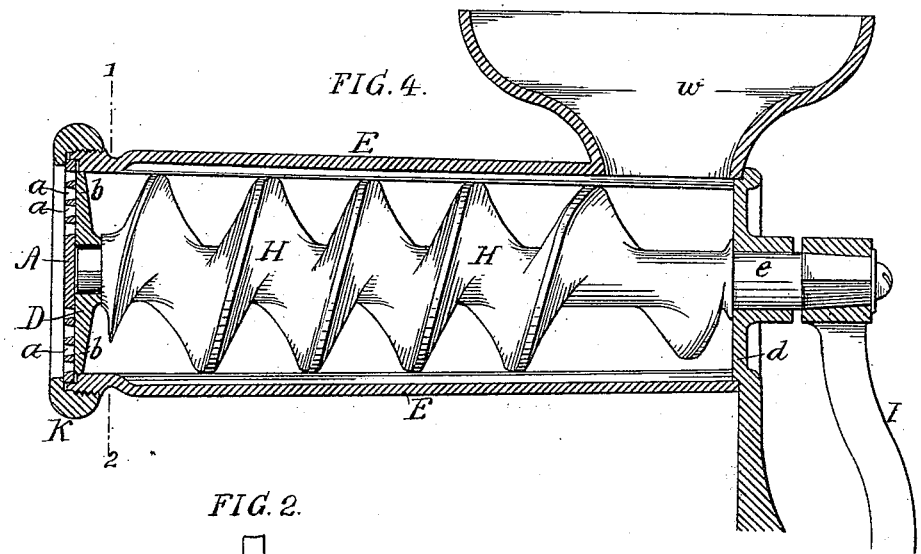
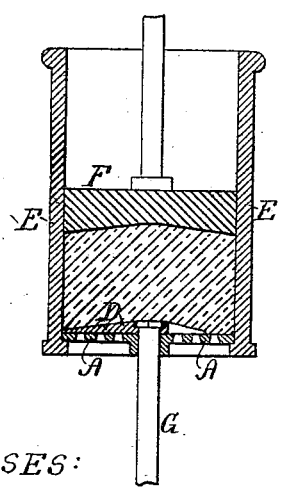
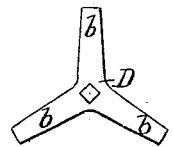
WITNESSES:
Harry Drury
James F. Tobin
INVENTOR:
John G. Baker
by his attys.
Howson and Son

UNITED STATES PATENT OFFICE.

JOHN G. BAKER, OF PHILADELPHIA, PENNSYLVANIA, ASSIGNOR TO THE ENTERPRISE MANUFACTURING COMPANY OF PENNSYLVANIA, OF SAME PLACE.

PROCESS OF CUTTING UP PLASTIC OR YIELDING SUBSTANCES.

SPECIFICATION forming part of Letters Patent No. 271,399, dated January 30, 1883.

Application filed December 1, 1882. (No model.)

*To all whom it may concern:*

Be it known that I, JOHN G. BAKER, a citizen of the United States, residing in Philadelphia, State of Pennsylvania, have invented a Process of Cutting Up Plastic or Yielding Substances, of which the following is a specification.

My invention consists in cutting up plastic or yielding substances into fragments of comparatively uniform size by forcing a crude mass of such substance directly against a perforated plate and severing from the mass such portions only of the same as may be forced into the said perforations.

In the accompanying drawings, Figure 1 is a sectional diagram illustrating the process; Fig. 2, a vertical section of mechanism by which the process may be carried into effect; Fig. 3, a view of the knife appertaining to Fig. 2; Fig. 4, a sectional view of the machine which I prefer for family use in practicing my invention; and Fig. 5, a transverse section on the line 1 2, Fig. 4.

Referring to the diagram Fig. 1, A is an exaggerated portion of a metal plate at the end of a casing or receptacle containing a crude mass, B, of the plastic or yielding substance to be cut up, *a* being one of a number of perforations in the plate.

As this substance is under confinement laterally, there are no avenues for its escape when it is forced against the plate other than the perforations in the same; hence when the substance is under pressure a portion of the mass will, owing to its yielding or plastic character, project into each perforation, and if a knife, D, be moved in the direction of the arrow, with its cutting-edge in contact with that face of the plate against which the substance is forced, so much of the same as may have entered the perforations will be cut off, and the fragments will be pushed through the perforations by successive protuberances of the substance, which, in their turn, are cut off.

This process of cutting up crude plastic and yielding materials may be conducted by machines varying in construction. For instance, the perforated plate A may be secured to the end of a hollow cylindrical casing, E, Fig. 2, containing a piston, F, by which the material is forced against the said plate. A revolving spindle, G, has one of its bearings in the plate, and is provided with a knife, D, having in the present instance three blades, *b*, Fig. 3, provision being made, in connection with the spindle, for maintaining the knives in proper cutting contact with that face of the plate against which the substance is pressed.

The size of the fragments into which the material will be cut up by this process will depend partly upon the size of the perforations in the plate, partly upon the pressure, partly on the rapidity of the action of the knives, and partly upon the consistency of the material operated on. For instance, if the perforations be large and the movement of the knives be slow, the fragments will be large, and if the pressure of the piston be increased the fragments will be larger; but if the action of the knives is more rapid the fragments will be reduced in size, and if the pressure be decreased, so as to reduce the extent of penetration of portions of the mass into the perforations, while the knives move more rapidly, the fragments will be of still farther reduced size. In other words, the size of the fragments will depend partly on the size of the perforations and partly on the extent to which the substance is permitted to penetrate the said perforations before its protuberances are cut off in the manner described.

It will thus be seen that masses of plastic or yielding material—meat, for instance—can be cut up or minced into well-divided fragments by simple pressing it, while in a crude unsevered condition, against the perforated plate, and in this respect my invention differs from the mincing operation in which a perforated plate with a knife has been heretofore used, for it was deemed necessary to subject the meat to a preliminary indiscriminate chopping or mincing by a complex system of preparatory chopping-knives, movable and stationary, before it reached the plate, the perforations in which were to prevent large lumps which escaped the action of the said preparatory knives from escaping before they were reduced to a size sufficient to pass through the perforations, pieces which had been chopped to a size smaller than the perforations passing freely through the same; hence there could be no uniformity in the sizes of the fragments.

I have been the first, I believe, to discover that plastic or yielding substances can be cut up into fragments of a comparatively uniform size by simply forcing the substance while in a crude state, and without any preliminary chopping or other disturbance, excepting that due to pressure, against a perforated plate and cutting off from the pressed mass such of the substance as enters the perforations, for it should be understood that I do not propose to force the substance through the said perforations, but to cut off the protuberances contained therein.

I have shown in Fig. 4 a simple machine by which the process can be carried into effect, and which has proved to be most effective in practice. In this case the casing E contains a propelling-screw, H, which has a journal, e, adapted to a bearing, d, at one end of the casing, and which is furnished with a suitable handle, I, the square or many-sided end of the screw entering a corresponding orifice in the knife, which has, in the present instance, four blades, as shown in Fig. 4, the perforated plate being confined to its place and forced against the knife by a screw-ring, K, adapted to the threaded end of the casing.

Slabs of meat in a crude condition or lumps of meat, suet, or other substance of a yielding or plastic character, are thrown into the hopper w, and are forced by the screw along the interior of the casing, and as portions of the meat under pressure imparted by the screw enter the perforations the protuberances contained in the latter are cut off from the mass by the knife which turns with the screw, the thread of which should extend as near to the end of the casing as the knife will permit. The larger the perforations and the fewer the blades of the knife the larger will be the fragments, and the smaller the perforations and the more numerous the blades of the knives the smaller will be the fragments, the pitch of the screw being the same.

It will be understood that the character of the substance as regards ready yielding and plasticity may vary, and some parts may penetrate the perforations more easily and farther under pressure than other parts; but the fragments cut up will have such uniformity of size as could not be attained if the substance should be subjected to chopping action in its passage through the machine.

It may be remarked that the casing E is grooved internally to prevent the substance from turning as it is forced forward by the screw.

I claim as my invention—

The mode or process herein described of cutting up plastic or yielding substances, the said mode consisting in forcing crude or uncut masses of such substance, while under confinement, against a perforated plate and severing from the mass so much only of the substance as may enter the perforations, substantially as set forth.

In testimony whereof I have signed my name to this specification in the presence of two subscribing witnesses.

JOHN G. BAKER.

Witnesses:
HARRY SMITH,
HENRY HOWSON, Jr.